(12) United States Patent
Nakayama et al.

(10) Patent No.: US 8,419,275 B2
(45) Date of Patent: Apr. 16, 2013

(54) TEMPERATURE SENSOR AND TEMPERATURE SENSOR SYSTEM

(75) Inventors: Noriyuki Nakayama, Saitama (JP);
Kazumasa Nakamura, Saitama (JP);
Hiroshi Misumi, Saitama (JP);
Terukazu Koike, Saitama (JP)

(73) Assignee: Shibaura Electronics Co., Ltd., Saitama-Shi (JP)

( * ) Notice: Subject to any disclaimer, the term of this patent is extended or adjusted under 35 U.S.C. 154(b) by 30 days.

(21) Appl. No.: 13/318,595

(22) PCT Filed: Mar. 18, 2010

(86) PCT No.: PCT/JP2010/001963
§ 371 (c)(1),
(2), (4) Date: Nov. 2, 2011

(87) PCT Pub. No.: WO2010/128573
PCT Pub. Date: Nov. 11, 2010

(65) Prior Publication Data
US 2012/0063488 A1    Mar. 15, 2012

(30) Foreign Application Priority Data

May 8, 2009    (JP) .................................. 2009-113845

(51) Int. Cl.
*G01K 7/00*    (2006.01)
*G01K 13/12*    (2006.01)

(52) U.S. Cl.
USPC ......................................... 374/185; 374/100

(58) Field of Classification Search ................... 374/185, 374/100
See application file for complete search history.

(56) References Cited

U.S. PATENT DOCUMENTS

| 5,674,008 A | * | 10/1997 | Allinson | 374/183 |
| 7,950,848 B2 | * | 5/2011 | Kimura et al. | 374/141 |
| 2002/0135455 A1 | | 9/2002 | Murata et al. | |
| 2006/0013282 A1 | * | 1/2006 | Hanzawa et al. | 374/163 |
| 2008/0080592 A1 | * | 4/2008 | Houben et al. | 374/185 |

FOREIGN PATENT DOCUMENTS

| DE | 102007000315 A1 | * | 12/2007 |
| JP | 01-60501 U | | 4/1989 |
| JP | 07-159250 A | | 6/1995 |
| JP | 07159250 A | * | 6/1995 |

(Continued)

OTHER PUBLICATIONS

International Search Report for PCT/JP2010/001963; Jun. 8, 2010.

*Primary Examiner* — Lisa Caputo
*Assistant Examiner* — Jamel Williams
(74) *Attorney, Agent, or Firm* — Pearne & Gordon LLP

(57) ABSTRACT

Provided is a temperature sensor capable of stably keeping the accuracy of detected temperatures. The temperature sensor of the present invention comprises a sensor element (1) comprising a temperature sensing element (2) whose electrical resistance changes according to temperature; a pair of lead wires (4) electrically connected to the temperature sensing element (2); and a covering material (5) which seals the temperature sensing element (2) and portions of the lead wires (4) in a prescribed range; wherein the lead wires (4) are led out of the sealed ends (6) of the covering material (5). The temperature sensor further comprises a metallic protective tube (20) which houses the sensor element (1) except part of the lead wires (4); and a shield comprising a ceramic sealed end closing element (7) which encloses the sealed ends (6), and a lead wire protective tube (8). The shield is loosely fitted inside the metallic protective tube (20).

8 Claims, 12 Drawing Sheets

FOREIGN PATENT DOCUMENTS

| | | | | |
|---|---|---|---|---|
| JP | 08-313367 | A | | 11/1996 |
| JP | 08313367 | A | * | 11/1996 |
| JP | 2002-350241 | A | | 12/2002 |
| JP | 2002350241 | A | * | 12/2002 |
| JP | 2006-294653 | A | | 10/2005 |
| JP | 2006-030025 | A | | 2/2006 |
| JP | 2006030025 | A | * | 2/2006 |
| JP | 2006294653 | A | * | 10/2006 |
| JP | 2007-212195 | A | | 8/2007 |
| JP | 2007212195 | A | * | 8/2007 |
| JP | 2007-327893 | A | | 12/2007 |
| JP | 2007327893 | A | * | 12/2007 |
| JP | 2008-215919 | A | | 9/2008 |
| JP | 2008215919 | A | * | 9/2008 |

* cited by examiner

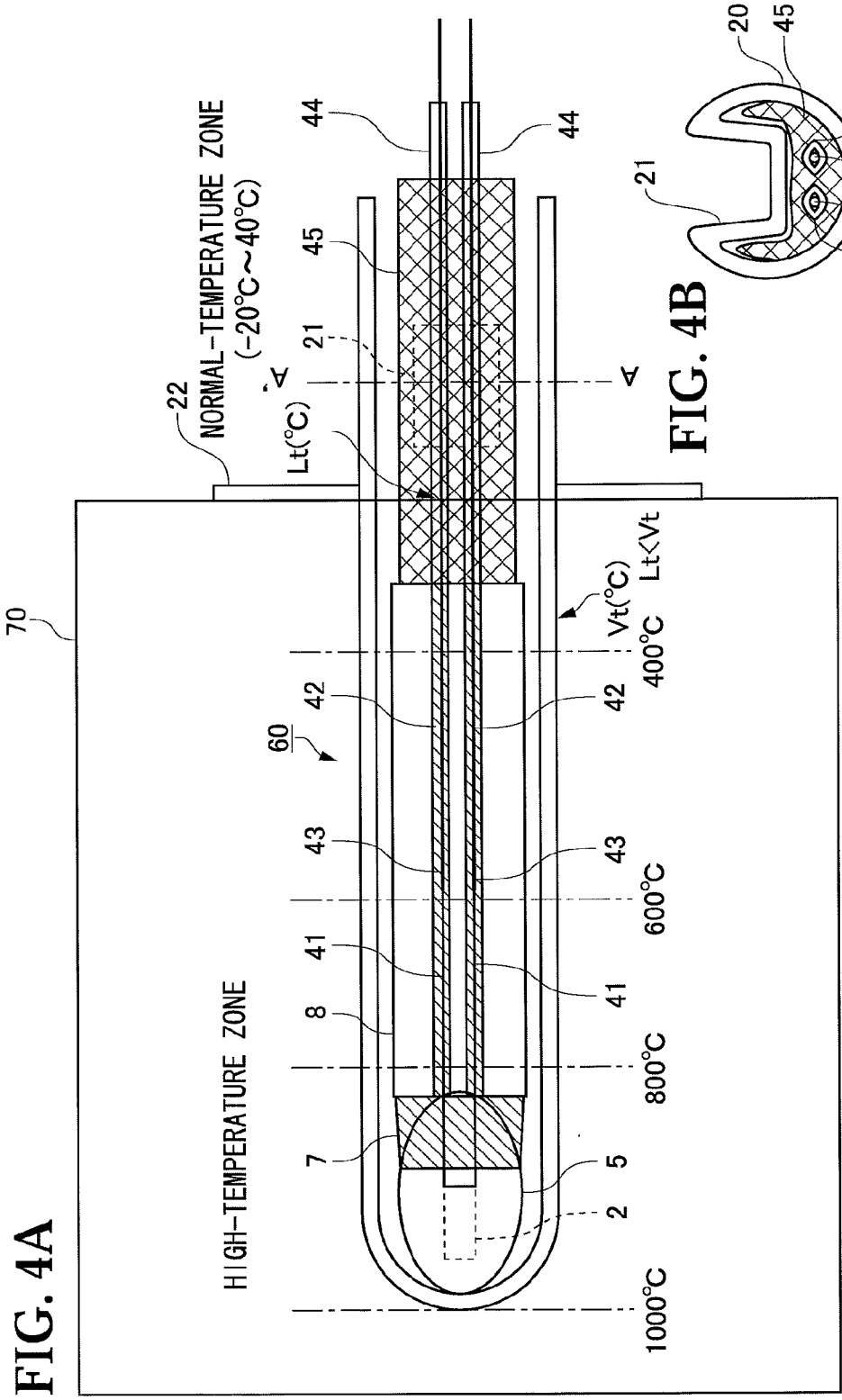

Tmax

Tmax

TEMPERATURE SENSOR AND TEMPERATURE SENSOR SYSTEM

TECHNICAL FIELD

The present invention relates to a temperature sensor provided with a temperature sensing element whose electric resistance changes according to temperature.

BACKGROUND ART

A temperature sensor which uses a temperature sensing element whose resistance value changes according to the temperature has been in widespread use in order to measure the temperature of automotive exhaust gas, a water heater, a boiler, a multifunction microwave oven, a stove and the like. As shown in FIG. 11, a temperature sensor element (hereinafter referred to simply as a sensor element) used in this temperature sensor comprises a temperature sensing element 2 provided with a pair of electrodes 3, a lead wire 4 connected to each of the electrodes 3 in pair, and a covering material which seals the temperature sensing element 2. The covering material is made of heat-resistant crystalline glass, amorphous glass or the like. When the sensor element is installed in an electric oven (an electrical degree sensor), a radiant heater, a combustion appliance, an exhaust gas purifier and the like, the sensor element is used by being housed in a metallic protective tube having a high sealing performance in order to protect the sensor element from vibrations, external forces, combustion gas and the like.

According to Patent Document 1, the oxygen partial pressure around the temperature sensing element 2 sometimes varies due to the oxidation of a metallic protective tube which constitutes a temperature sensor when the use environment temperature becomes not less than 750° C. and as a result of this, the composition of the temperature sensing element 2 varies and the temperature-resistance value characteristic becomes unstable. Hence, Patent Document 1 proposes that a vibration-resistant filler with porosity of 30 to 70% be filled in the metallic protective tube.

Patent Document 1 adopts a method which involves simultaneously inserting a fluid vibration-resistant filler and a temperature sensor element into a metallic protective tube, burying both, and hardening the fluid vibration-resistant filler by heating. Although due to the volatilization of a binder during the hardening of the vibration-resistant filler bubbles may remain after hardening, it is impossible to check the existence of bubbles. Furthermore, because the vibration-resistant filler during the insertion into the metallic protective tube is in a powdery state, the filling density of the vibration-resistant filler in the metallic protective tube is not sufficient. Therefore, it cannot be said that a temperature sensor which is obtained has sufficient reliability against variations in oxygen partial pressure, and the accuracy of detected temperatures is unstable.

CITATION LIST

Patent Document

Patent Document 1: Japanese Patent Laid-Open No. 2008-215919
Patent Document 2: Japanese Patent No. 3806434

SUMMARY OF INVENTION

Technical Problems

The present invention was achieved in view of these technical problems, and the object of the invention is to provide a temperature sensor which is capable of keeping the accuracy of detected temperatures in a stable manner even in a high-temperature environment of not less than 500° C.

Solution to Problem

When a temperature sensor is used at high temperatures of 500° C. to 1000° C., the oxidation deterioration of a metallic protective tube which protects the temperature sensor becomes remarkable. A metallic protective tube is made of stainless alloys and Ni-based superalloys excellent in high-temperature resistance. In these heat-resistant alloys, component metals (chromium, nickel, iron and the like) are vaporized and emitted in the process of oxidation deterioration. It is generally known that platinum, platinum alloys and nickel which constitute lead wires of a temperature sensor element also begin to be vaporized when the temperature exceeds 500° C. These unstable metals which have been vaporized become oxides having electrical conductivity.

When temperatures of not less than 500° C. are measured, a temperature sensor element which constitutes a temperature sensor is placed in a closed environment within a metallic protective tube and hence the temperature sensor element is exposed to an atmosphere environment having high metal vapor concentrations.

Because a covering material 5 made of crystalline glass, amorphous glass or the like which have high insulating performance is interposed between lead wires 4, as shown in FIG. 12A, no leak current is generated between the lead wires 4 even when a sensor element is energized. Incidentally, in FIGS. 12A and 12B, the arrows indicate current. However, as described above, when a substance having electrical conductivity, for example, chromium oxide, adheres in such a manner as to bury the area between the lead wires 4, the insulating performance between the lead wires 4 is impaired and as shown in FIG. 12B, a leak current is generated by energization between the lead wires 4, resulting in the occurrence of electrolytic etching (high-temperature migration). As a result, detected temperatures obtained by a temperature sensor become inaccurate.

As described above, the vaporization and emission of metal from the metallic protective tube and the lead wires 4 is the cause of high-temperature migration. Hence, as a precondition, the temperature sensor of the present invention comprises a sensor element and a metallic protective tube which houses the sensor element except part of lead wires. And the sensor element has a temperature sensing element whose resistance changes according to the temperature, a pair of lead wires electrically connected to the temperature sensing element, and a covering material which seals the temperature sensing element and the lead wires in a prescribed range from the connections. This sensor is such that the lead wires are taken out of the sealed ends.

The temperature sensor of the present invention having the above-described configuration comprises a ceramic shield comprising a sealed end closing section which encloses the sealed ends, and a lead wire protective section in which the lead wires taken out of the sealed ends are housed in a piercing manner. And the temperature sensor of the present invention is loosely fitted inside the metallic protective tube.

In the above-described temperature sensor, the sealed end closing section present between the temperature sensing element and the metallic protective tube encloses the sealed ends, thereby preventing a substance having electrical conductivity from adhering to areas between the lead wires 4.

The temperature sensor of the present invention comprises a lead wire protective section. The temperature sensor has a temperature gradient which is such that the front side where the temperature sensing element is present during use obtains a high temperature and the temperature becomes low toward the rear side from there. Therefore, the lead wire protective section covers the portion that is heated up to the vaporization temperature of the lead wire material where the lead wires begin to vaporize. This contributes to the prevention of vaporization of metal from the lead wires.

Furthermore, in the present invention, the shield is loosely fitted inside the metallic protective tube. Because the protective tube is made of metal and the shield is made of ceramic, the two have a difference in the linear expansion coefficient. For example, the linear expansion coefficient of Ni-based superalloys is $11\times10^{-6}/°C$. to $12\times10^{-6}/°C$. and the linear expansion coefficient of alumina is $7\times10^{-6}/°C$. to $8\times10^{-6}/°C$. For this reason, if a temperature sensor in which a shield is housed in a metallic protective tube in a tight manner is used for a long period, clearances are repeatedly formed between the protective tube and the shield, whereby it becomes impossible for the temperature sensor to keep the initial state. Therefore, detected temperatures become unstable. In contrast, for example, if a clearance is provided from the first between the metallic protective tube and the shield, it is possible to avoid the above-described harmful influence based on a difference in the linear expansion coefficient. Even if a clear clearance is not provided in the whole area between the metallic protective tube and the shield, this effect can be enjoyed. For example, even when the metallic protective tube and the shield are in contact with each other partially, a loose fit is provided so that there is the play between the metallic protective tube and the shield, the above-described harmful influence based on a difference in the linear expansion coefficient can be avoided.

Therefore, the present invention specifies that the temperature sensor of the present invention is loosely fitted inside the metallic protective tube.

In addition, in the temperature sensor of the present invention which is such that from the beginning the shield is loosely fitted inside the metallic protective tube, it is necessary only that a sensor element unit in which the sensor element and the shield are integrally formed beforehand be inserted into the metallic protective tube which is separately formed beforehand and fixed thereto. Therefore, manufacturing is easy.

Furthermore, in the temperature sensor of the present invention, the lead wire protective section preferably comprises a protective section body having the through holes through which the lead wires pierce and a filling material made of ceramic which is interposed between the protective section body and the lead wires which pierce through the through holes. The lead wires can be shut off from the outside air and the lead wires can be fixed within the lead wire protective section. This filling material can be formed from a ceramic body which is formed integrally with the shield.

In the present invention, the side where the temperature sensing element is arranged is defined as front (forward) and the side where the lead wires are provided in an extended manner is defined as rear (rearward).

In many cases the resistance value of a temperature sensing element (a thermistor) is on the order of $1000\Omega$ or less than this value when a temperature signal obtained by a temperature sensor is converted to a electrical signal and the temperature coefficient of the resistance value (change in electrical resistance per $°C$.) is small, thus posing a problem. In order to permit temperature measurement in a wide temperature range from low to high temperatures while avoiding high-temperature migration, it is necessary to reduce a flowing current and this inevitably results in a decrease in output voltage per $°C$. If temperatures in the range of $0°C$. to $1000°C$. are to be detected by an AD converter, the AD converter must provide resolution of not less than 10 bits. AD converters having 10-bit exceeding resolution of 12 bits and 16 bits are relatively expensive as mass-produced products and are unsuitable for use in consumer goods. An amplifier which amplifies detected voltage with a high magnification and with high accuracy becomes necessary for using a 10-bit AD converter. However, the use of an amplifier provides a bottleneck of high cost.

Cost increases when a high-magnification, high-accuracy amplifier is used. Therefore, it is desired that a large current which barely prevents the self-heating of a temperature sensor element be caused to flow or alternatively a large pulse current be caused to flow and the duty during energization time be appropriately selected, whereby a voltage signal which is as large as possible be taken out without self-heating. However, if the voltage increases, the danger of high-temperature migration increases. Therefore, it has hitherto been impossible to put on the market a temperature sensor system which can be used for long hours in a more stable manner in a high-temperature region exceeding $500°C$.

However, because the use of the temperature sensor of the present invention casts the concern about high-temperature migration aside, it is possible to use an energization circuit using no amplifier.

Therefore, the temperature sensor system of the present invention provides a temperature sensor system which comprises: any one of the above-described temperature sensors; an energization circuit which supplies a temperature detection current to the temperature sensor; an AD converter to which temperature information detected by the temperature sensor is inputted as an analog voltage signal; and a controller which performs control actions by converting a digital signal converted by the AD converter into temperature, in which the energization circuit supplies the temperature sensor with a pulsed temperature detection current on the basis of instructions of the controller.

Advantageous Effects of Invention

According to the temperature sensor of the present invention, it becomes possible to prevent the high-temperature migration caused by the adherence of a conductive substance to the area between lead wires and to keep the sealed condition of a temperature sensing element by a covering material. Therefore, it is possible to stably ensure the detected temperature accuracy of the temperature sensor.

BRIEF DESCRIPTION OF DRAWINGS

FIG. 4A is a longitudinal sectional view of a temperature sensor of the fifth embodiment, and FIG. 4B is a sectional view on the A-A' in FIG. 4A.

DESCRIPTION OF EMBODIMENTS

First Embodiment

Hereinafter the present invention will be described in detail on the basis of the embodiments shown in the accompanying drawings.

Figure 1A:
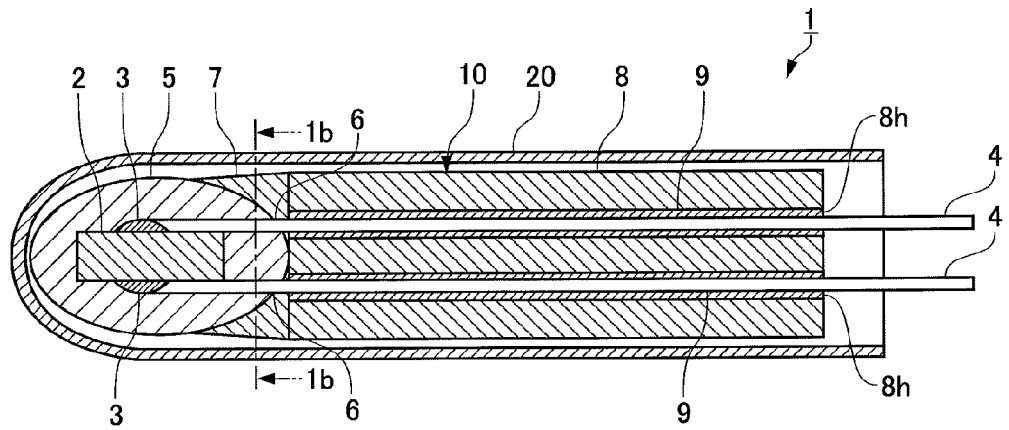
FIG. 1A is a longitudinal sectional view of a temperature sensor of the first embodiment.

FIG. 1A shows a temperature sensor 1 of the first embodiment of the present invention.

The temperature sensor 1 comprises a sensor element unit 10 and a metallic protective tube 20 which houses the sensor element unit 10 except part of the lead wires 4 on the rear side.

The temperature sensor unit 10 comprises a temperature sensing element 2 whose electrical resistance changes according to the temperature, a pair of lead wires 4 electrically connected to the temperature sensing element 2 via an electrode 3, and a covering material 5 which seals the temperature sensing element 2 and the lead wires 4 in a prescribed range from the electrode 3. The lead wires 4 are taken out of sealed ends 6 of the covering material 5.

Although it is preferable to use a thermistor as the temperature sensing element 2, temperature sensing elements whose electrical resistance changes according to the temperature can be widely applied. In the case of a thermistor, when used in a high-temperature region of 500 to 1000° C., for example, as disclosed by the inventors of the present invention in Patent Document 2, it is preferable to use a metal oxide which contains Y, Cr, Mn, Ca and O and whose mole ratio of Y:Cr:Mn:Ca is 75 to 85:7 to 10:7 to 10:1 to 5. A temperature sensing element 2 made of this metal oxide permits temperature measurement up to high temperatures of not less than 1000° C. However, this is illustrative only and it is needless to say that other thermistors can also be used.

Platinum or platinum alloys can be used as the lead wires 4. As platinum alloys, those containing 1 to 20 wt % of iridium are preferable from the standpoint of high-temperature endurance.

The covering material 5 is made of amorphous glass or crystalline glass. Although each can be used singly, it is also possible to use both amorphous glass and crystalline glass in a mixed condition so as to have a desired thermal expansion coefficient. As crystalline glass, those composed of, for example, silicon oxide, calcium oxide, magnesium oxide and aluminum oxide are preferable, and more specifically, those having the composition comprising $SiO_2$: 30 to 60 wt %, CaO: 10 to 30 wt %, MgO: 5 to 25 wt %, and $Al_2O_3$: 0 to 15% can be used in the present invention. Furthermore, the covering material 5 may also be made of those obtained by adding an inorganic material powder to glass, and the like. Examples of an inorganic material powder to be added to glass include metal oxides and the like of which the temperature sensing element 2 is made, such as aluminum oxide ($Al_2O_3$), magnesium oxide (MgO), yttrium oxide ($Y_2O_3$), chromium oxide ($Cr_2O_3$), and zirconium oxide ($ZrO_2$).

This sensor element unit 10 comprises a sealed end closing element 7 made of ceramic and a lead wire protective tube 8 in which a pair of lead wires 4 is housed in a piercing manner behind the sealed end closing element 7. The sealed end closing element 7 and the lead wire protective tube 8 constitute the shield of the present invention.

The sealed end closing element 7 provided between the sensor element unit 10 and a metallic protective tube 20 has a contour in the shape of a circular truncated cone, and encloses sealed ends 6 by surrounding the rear end side of a covering material 5. Therefore, a conductive composition does not adhere to the area between the lead wires 4. The sealed end closing element 7 is made of ceramic, such as alumina ($Al_2O_3$) and silicon nitride ($Si_3N_4$). The method for forming the sealed end closing element 7 will be described later.

The cylindrical lead wire protective tube 8 which is continuous with the sealed end closing element 7 is such that two holding holes 8h in which the pair of lead wires 4 are housed and held are formed in an axially piercing manner. Although it is possible to provide one hole which can house the two lead wires 4 as the holding hole 8h, providing two holding holes 8h so as to correspond to each of the lead wires 4 is preferable for fixing the lead wires 4 in prescribed positions. In the holding hole 8h, a filling material 9 made of ceramic is interposed in the clearance except the lead wires 4. This enables to fix the lead wires 4 in prescribed positions and enables to shut off the lead wires 4 from an atmosphere in which a conductive composition is scattered even if the temperature sensor 1 is used in a temperature region of not less than 500° C.

It is preferred that in order to protect the lead wires 4, the lead wire protective tube 8 has a length large enough to house a region in which the temperature of the lead wires 4 becomes not less than 500° C. during the use of the temperature sensor 1.

As with the sealed end closing element 7, the lead wire protective tube 8 and the filling material 9 are made of alumina ($Al_2O_3$), silicon nitride ($Si_3N_4$) and the like.

The temperature sensor 1 is fabricated by inserting the sensor element unit 10 which is integrally formed beforehand into the metallic protective tube 20 which is separately formed beforehand, and fixing the sensor element unit 10 thereto. At this time, a clearance is provided between the portion of the shield comprising the sealed end closing element 7 and the lead wire protective tube 8 and the metallic protective tube 20, whereby the shield is caused to be loosely fitted inside the metallic protective tube 20. Incidentally, the present invention allows the forward end of the covering material 5 to be abutted directly against the internal circumferential surface of the metallic protective tube 20 in order to increase thermal conduction from the metallic protective tube 20 to the covering material 5, and the present invention also allows a filling material and an adhesive to be interposed between the forward end of the covering material 5 and the metallic protective tube 20, whereby the forward end of the covering material 5 is abutted indirectly against the internal circumferential surface of the metallic protective tube 20. Also in this case, needless to say, a clearance is provided between the portion of the shield comprising the sealed end closing element 7 and the lead wire protective tube 8 and the metallic protective tube 20, whereby the shield is caused to be loosely fitted.

Preparing the portion housed in the metallic protective tube 20 as the sensor element unit 10 like this provides the advantage that the finish quality of the unit can be visually inspected.

The temperature sensor 1 comprises the metallic protective tube 20 which houses the sensor element unit 10 except part of the rear side of the lead wires 4. The metallic protective tube 20 is made of stainless alloys, Ni-based superalloys and other heat-resistant alloys. These alloys contain Ni and Cr in large quantities in order to ensure heat resistance, for example, JIS NCF600, which is an example of Ni-based superalloy, contains about 75 wt % Ni and about 16 wt % Cr.

Because the metallic protective tube 20 is exposed to an oxidizing atmosphere during use, the metallic protective tube 20 is oxidized in the course of use. If the properties of the metallic protective tube 20 change like this, this induces detected temperature errors. When the metallic protective tube 20 is oxidized, the interior of the metallic protective tube 20 comes to a reduction condition, and $O_2$ is removed from the temperature sensing element 2 made of an oxide, whereby the temperature sensing element 2 is caused to develop a composition deviation.

For this reason, the properties of the temperature sensing element 2 change and this might induce detected temperature errors. Therefore, it is preferred that the surface of the metallic protective tube 20 be subjected to oxidation treatment beforehand.

The metallic protective tube 20 is provided to hold the temperature sensing element 2 and the lead wires 4 and to protect those which are housed from the mechanical stress from outside the metallic protective tube 20.

The metallic protective tube 20 is a pipe-shaped object, which is such that one end thereof (the forward end side) which houses the temperature sensing element 2 for measuring temperature is blocked (closed) and the other end thereof (the rear end side) is open for leading out the lead wires 4.

The lead wires 4 which are taken out are connected to flexible electrical wires with insulating coating which are coated with polyethylene, Teflon (registered trademark), silicon, vinyl chloride and the like for connection with the measurement circuit.

For this reason, it is necessary that during use the temperature of the rear end side of the metallic protective tube 20 have dropped to a temperature region in which these organic materials can be used.

Furthermore, in mounting the metallic protective tube 20 to a high-temperature furnace and the like, low temperatures of the mounting area are advantageous in terms of properties, such as strength, corrosion resistance and response of the temperature sensor. Therefore, in general, the mounting area is provided on the rear end side of the metallic protective tube 20.

On the other hand, the forward end side of the metallic protective tube 20 is under high temperatures because of the measurement of temperature, and there is a temperature difference (temperature distribution, temperature gradient) between the forward end and the rear end of the metallic protective tube 20. For example, it happens that the temperature on the forward end side is 800° C., while the temperature on the rear end side is 200° C.

The forward end side of the metallic protective tube 20 is closed. This is because the constant environment in the metallic protective tube 20 which houses the temperature sensing element 2 should be isolated from various atmospheres under high temperatures of oxidation, reduction, sulfuration and the like.

When high temperatures are measured by housing the temperature sensing element 2 in the metallic protective tube 20 which plays such a role, at the forward end of the metallic protective tube 20 which obtains high temperatures, the emission (vaporization) of metal occurs on both the outer circumferential surface and the inner circumferential surface of the metallic protective tube 20 along with oxidation and reduction. In particular, the inner circumferential surface of the metallic protective tube 20 provides a closed environment and, therefore, the amount of metal vaporization increases compared to the outer circumferential surface thereof.

On the other hand, the temperature distribution is such that the nearer to the rear end, the lower the temperature, and hence the amount of metal vaporization decreases as the measuring point approaches the rear end of the metallic protective tube 20. This can be explained by the deposition amount of chromium, as an example.

That is, in actuality, a large amount of chromium is deposited on the temperature sensing element 2 arranged on the forward end side of the metallic protective tube 20, and the amount of chromium deposited decreases in the direction approaching the rear end of the metallic protective tube 20.

Because also the lead wires 4 taken out of the temperature sensing element 2 are governed by the temperature distribution of the metallic protective tube 20, there is an increase in the amount of metal vaporization from the lead wires 4 in the vicinity of the temperature sensing element 2 which becomes on a high-temperature side.

When a metal is vaporized from the lead wires 4, a clearance is formed between the lead wires 4 and the covering material 5, and this causes high-temperature migration when the temperature sensing element 2 is energized.

From the foregoing, it is preferred that the temperature sensor have such a construction that the lead wires 4 are prevented from becoming thinner due to metal vaporization, and that the metal vaporized from the lead wires 4 be prevented from being scattered to other places, and that the metal which comes flying from the metallic protective tube 20 and the metal vaporized from the lead wires 4 be prevented from depositing between the lead wires 4. Furthermore, it is preferred that the temperature sensor 1 be configured in such a manner that the temperature of the lead wires 4 exposed from the lead wire protective tube 8 become the temperature at which metal is not vaporized or, in the case of metal vaporization, the amount of metal vaporization can be restrained to a trace amount, for example, not more than 400° C.

Next, with reference to FIGS. 3A to 3E, a schematic procedure for fabricating the sensor element unit 10 will be described. It is presumed that the temperature sensing element 2, the lead wires 4 and the covering material 5 have been assembled in beforehand. For the sake of convenience, this assembly may sometimes be referred to as a unit intermediate.

Figure 3A:
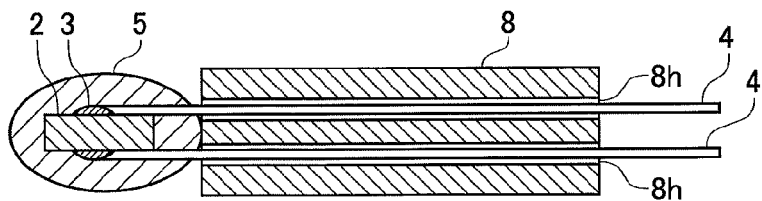
FIGS. 3A to 3E are diagrams to show the procedure for fabricating a sensor element unit according to the first embodiment.

As shown in FIG. 3A, the lead wires 4 are inserted into the holding holes 8h of the lead wire protective tube 8 until the rear end of the covering material 5 of the unit intermediate and the front end of the lead wire protective tube 8 come into contact with each other.

Figure 3B:
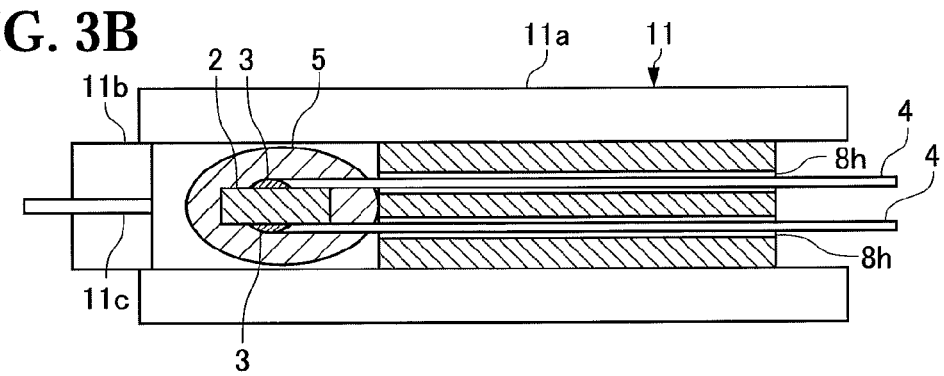

Next, as shown in FIG. 3B, the unit intermediate is arranged in a molding tool 11. The molding tool 11 comprises a main mold 11a and a head 11b, and an injection opening 11c is formed in the head 11b. A raw material LM for forming the sealed end closing element 7 and the filling material 9 is injected from a raw material supply source, which is not shown, into the main mold 11a via the injection opening 11c. The unit intermediate is such that there is a clearance between the circumference of the covering material 5 and the main mold 11a, and the lead wire protective tube 8 is arranged in the molding tool 11 with no clearance between itself and the main mold 11a.

Figure 3C:
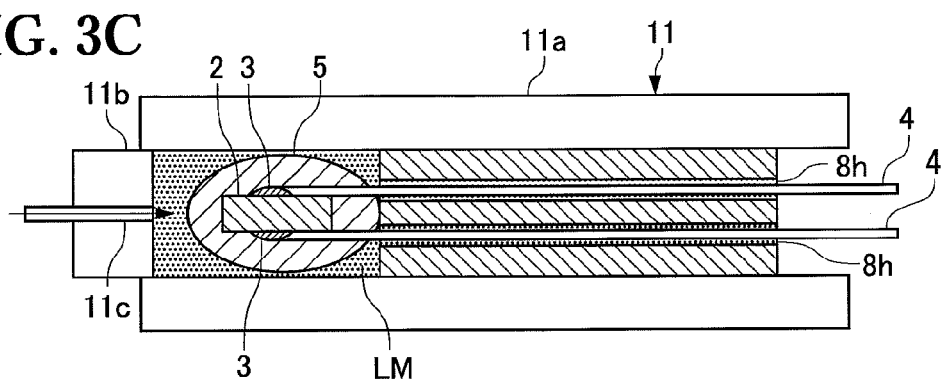

As shown in FIG. 3C, after the arrangement of the unit intermediate in a prescribed position in the molding tool 11, the raw material LM is injected under pressure from the injection opening 11c. This raw material LM comprises a ceramic powder and a dispersion media and has flowability. Alcohol-based or water-based liquid materials which give flowability to the raw material LM can be widely applied as dispersion media.

Because a clearance is provided between the main mold 11a and the maximum-outside diameter portion of the covering material 5, the raw material LM passes through this clearance and reaches the front end of the lead wire protective tube 8, thereby capable of surrounding the rear end side of the covering material 5. Furthermore, the raw material LM enters clearances between the lead wires 4 and the holding holes 8h of the lead wire protective tube 8 and these clearances are filled with the raw material LM. However, because the lead wire protective tube 8 is arranged in the main mold 11a without a clearance, the raw material LM is not supplied to the circumference of the lead wire protective tube 8.

Figure 3D:
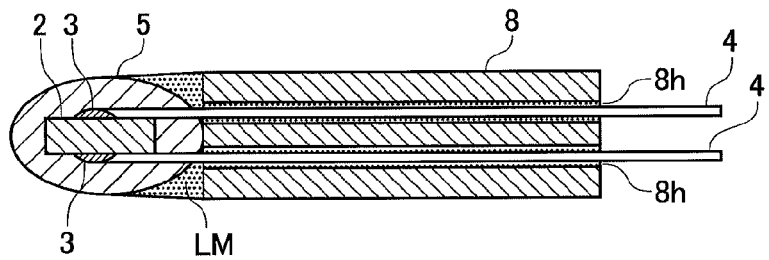

After the raw material LM fills the clearances between the lead wires 4 and the holding holes 8h of the lead wire protective hole 8h, as shown in FIG. 3D, the unit intermediate is taken out of the molding tool 11. An extra raw material LM on the outer circumference of the covering material 5 is removed and the contour of the coating material 5 is conditioned. Because the contour is conditioned like this, the sealed end closing element 7 has the shape of a circular truncated cone. Although it is not compulsory to remove an extra raw material LM, in order to increase the sensitivity of temperature detection of the temperature sensing element 2, it is preferred that while the rear end side of the covering material 5 be surrounded by the raw material LM, the front end side be not covered with the sealed end closing element 7 by removing an extra raw material LM, with the covering material 5 exposed.

Figure 3E:
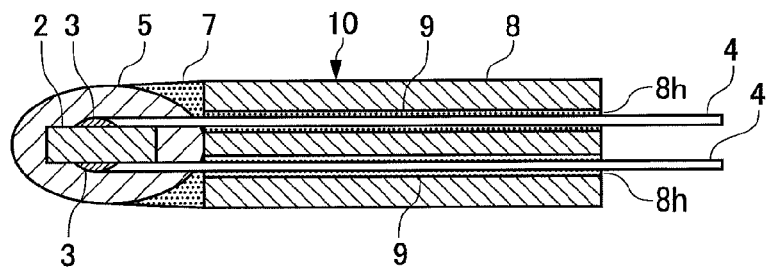

After that, the unit intermediate is heated to a prescribed temperature, whereby the raw material LM is sintered and the sealed end closing element 7 and the filling material 9 are obtained (FIG. 3E).

The above-described method for fabricating the sensor element unit 10 has the advantage that by using the single step of injection, it is possible to supply the raw material LM to portions corresponding to the sealed end closing element 7 and the filling material 9. In addition, because the sealed end closing element 7 and the filling material 9 are made of integrated ceramic after sintering, it is possible to strongly join the unit intermediate and the lead wire protective tube 8.

Furthermore, in the above-described sensor element unit 10, the lead wire protective tube 8 is made of a ceramic sintered beforehand and hence it is possible to position the lead wires 4 with good accuracy. The sealed end closing element 7 and the filling material 9 are molded using the raw material LM having flowability, and then they are sintered. The sintering can be completed in a short time because of small volumes of the sealed end closing element 7 and the filling material 9.

Figure 1B:
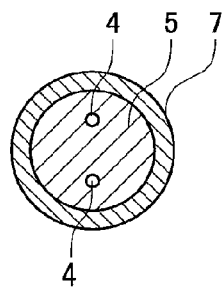
FIG. 1B is a sectional view taken in the direction of arrow 1b-1b of FIG. 1A (with the exception of a metallic protective tube 20)

Although the lead wire protective tube 8 is used in the temperature sensor 1 of the first embodiment, the present invention is not limited to this, and it is possible to adopt the configurations shown in FIG. 1C, and FIGS. 2A and 2B as will be described below. Incidentally, in the following embodiments, same numerals refer to same component parts in FIGS. 1A to 1C and descriptions of these parts are omitted.

Second Embodiment

Figure 1C:
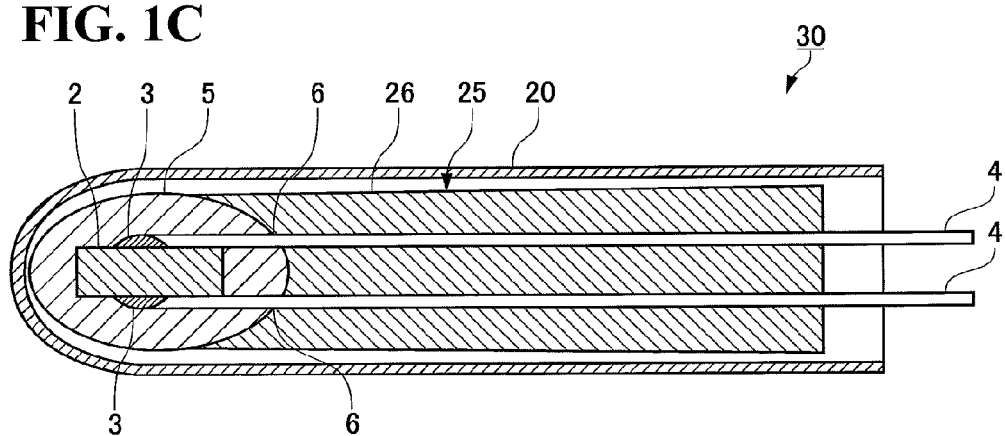
FIG. 1C is a longitudinal sectional view of a temperature sensor of the second embodiment.

The temperature sensor 30 of FIG. 1C comprises a sensor element unit 25 and a metallic protective tube 20 which houses the sensor element unit 25 except part of the lead wires 4 on the rear side. It can be considered that in the sensor element unit 25, a shield 26 is obtained by integrally fabricating the sealed end closing element 7 and lead wire protective tube 8 of the first embodiment. In the same manner as in the first embodiment, the shield 26 can be formed by supplying a raw material LM made of a ceramic powder and a dispersion media to a prescribed region in a mold and fabricating a molded body, which is thereafter sintered. The same applies also to the third embodiment and the fourth embodiment.

Also in the sensor element unit 25 of this second embodiment, the shield 26 surrounds the rear end side of a covering material 5, encloses sealed ends 6, and protects the lead wires 4.

Third Embodiment

Figure 2A:
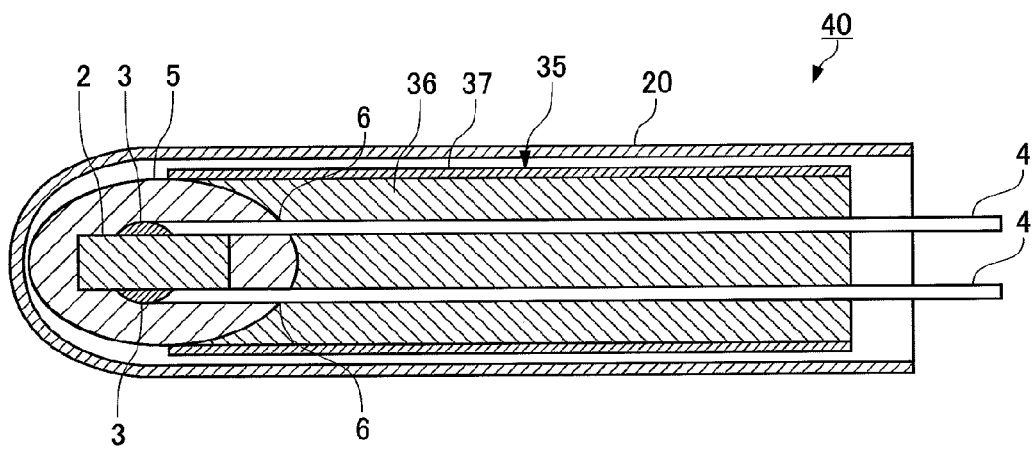
FIG. 2A is a longitudinal sectional view of a temperature sensor of the third embodiment.

The temperature sensor 40 of FIG. 2A comprises a sensor element unit 35 and a metallic protective tube 20 which houses the sensor element unit 35.

The sensor element unit 35 comprises a coated tube 37 made of ceramic which covers a shield 36 similar to the shield 26 of the second embodiment. Also in this sensor element unit 35 of the third embodiment, the shield 36 and the coated tube 37 close sealed ends 6 by surrounding the rear end side of a covering material 5, and protect lead wires 4.

Fourth Embodiment

Figure 2B:
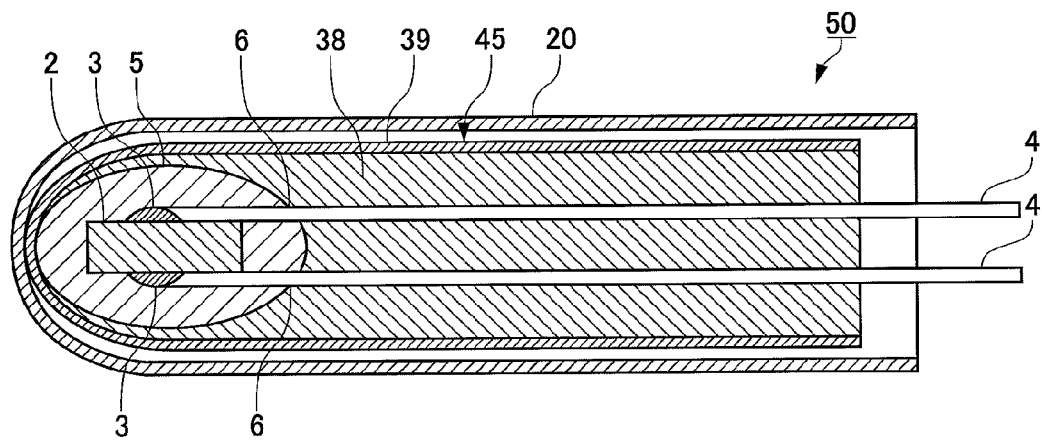
FIG. 2B is a longitudinal sectional view of a temperature sensor of the fourth embodiment.

The temperature sensor 50 of FIG. 2B comprises a sensor element unit 45 and a metallic protective tube 20 which houses the sensor element unit 45.

The sensor element unit 45 comprises a shield 38 which covers the area up to the forward end of a covering material 5 and is further provided with a coated tube 39 made of ceramic, which houses the shield 38. Also in this sensor element unit 45 of the fourth embodiment, the shield 38 and the coated tube 39 close sealed ends 6 by surrounding the rear end side of a covering material 5, and protect lead wires 4.

Fifth Embodiment

A more concrete temperature sensor which is suitable for making temperature measurements under high temperatures of not less than 500° C. will be described on the basis of FIGS. 4A and 4B.

The basic configuration of a temperature sensor 60 is in accordance with the temperature sensor 1 of the first embodiment and, therefore, in the following, the description will be given mainly of differences from the temperature sensor 1.

In the temperature sensor 60, lead wires 4 are composed of first lead wires 41 made of Pt or a Pt alloy and second lead wires 42 made of Ni or a Ni alloy. The first lead wires 41 are connected directly to a temperature sensing element 2, and the second lead wires 42 are connected to the first lead wires 41 at connections 43. The first lead wires 41 made of Pt or a Pt alloy are arranged on the side exposed to higher temperatures, and second lead wires 42 made of Ni or a Ni alloy are arranged on the rear end side compared to that side.

The second lead wires 42 are provided with insulating coatings 44 on the rear end side where the second lead wires 42 are exposed from a lead wire protective tube 8. Furthermore, the greater part of each of the areas provided with the insulating coatings 44 is covered with a mesh-texture braided tube 45 made of glass fiber or ceramic fiber.

As shown in FIG. 4B, by providing a swaged portion 21 in part of the metallic protective tube 20, it is possible to fix the lead wires 4 along with the mesh-texture braided tube 45 to the metallic protective tube 20.

If during temperature detection, the temperature of the portions of the lead wires 4 taken out of the lead wire protective tube 8 is designated by Lt (° C.) and the temperature at which the metal of the metallic protective tube 20 and the lead wires 4 begins to be vaporized due to heating is designated by Vt (° C.), it is preferred that Lt and Vt be in the relation Vt>Lt.

Furthermore, during temperature detection, it is preferred that the connections 43 between the first lead wires 41 and the second lead wires 42 be provided in positions where the temperature is not more than 600° C.

The temperature sensor 60 is mounted to an enclosure 70 through the use of a mounting flange 22 in order to perform temperature detection. It is necessary that the forward end of the metallic protective tube 20 be exposed to a high-temperature zone in the interior of the enclosure 70. The reason why the temperature sensor 60 is mounted to the enclosure 70 is that this prevents human harm by isolating the high-temperature zone and a normal-temperature zone outside the high-temperature zone, or that this is necessary for efficiently increasing the temperature of the high-temperature zone. Therefore, in many cases, the enclosure 70 has temperatures in an intermediate region between high temperatures and normal temperatures.

When the temperature sensor 60 is mounted to the enclosure 70, the temperature of the metallic protective tube 20 of the temperature sensor 60 is highest in the forward end where the temperature sensing element 2 is housed and the temperature of the open end of the metallic protective tube 20 where the lead wires 4 are taken out is lowest.

For example, the temperature distribution of 1000 to 400° C. of FIG. 4A is obtained.

As a result of this, the heat dissipation phenomenon that the heat of the high-temperature zone escapes from the metallic protective tube 20 and transfers to the normal-temperature zone occurs. When heat dissipation is great, the length of the metallic protective tube 20 is increased, whereby it is necessary to reduce detected temperature errors.

As shown in FIG. 4A, it is preferred that the rear ends of the taken-out portions of the lead wires 4 be extended to places where the temperature is lower than the temperature of the enclosure 70 and be connected to the lead wires 4 with insulating coating.

If the metallic protective tube 20 is too long, manufacture by drawing/ironing is difficult. It is said that for drawing/ironing processed products, in general, lengths which correspond to inside diameter×10 to 20 times provide limits of manufacture. For example, in the case of a metallic protective tube 20 having an inside diameter of 3 mm, manufacture by drawing/ironing is possible only for total lengths of 30 mm to 60 mm.

In order to cope with this situation, the metallic protective 20 is made as dual-partitioned forward end and rear end portions and the two portions are integrated during the manufacturing process, or a seam tube or a seamless tube is cut to a necessary length and one end is sealed to ensure the length of the metallic protective tube 20. The present embodiment takes this into consideration too.

That is, in local high-temperature zones of flame temperature, exhaust gas temperature and the like which occur frequently in applications of high temperature measurements in the monitoring of combustion condition, the transfer of heat from the heat source to the metallic protective tube 20 occurs in very large quantities. Therefore, via the enclosure 70 and the flange 22, the metallic protective tube 20 is locally cooled in a forced manner by water cooling or air cooling, whereby the temperature sensor 60 can be configured even for a metallic protective tube 20 having a short total length. That is, it becomes possible to use the above-described metallic protective tube 20 by drawing/ironing.

The foregoing produces the following advantages.

By shortening the total length of the metallic protective tube 20, it is possible to use long lead wires used in the manufacture of the temperature sensing element 2 as they are. When there is no lead wire 4 during the manufacture of the temperature sensing element 20, it is impossible to perform the inspection of temperature detection errors. In particular, when the temperature is high, the lead wires 4 are indispensable.

It is possible to subject the temperature sensing element 2 to various kinds of treatments (coating and dipping), with the temperature sensing element 2 held by the lead wires 4. Because the lead wires 4 are connected to a pair of electrodes 3 of the temperature sensing element 2, the lead wires 4 can be used as signal lines.

Furthermore, also for the lead wire protective tube 8, it becomes possible to use extruded products and pressed products of ceramic because of the short length of the metallic protective tube 20.

Incidentally, the manufacturing limits of extruded products and pressed products of ceramic are equal to or not more than the manufacturing limits of the metallic protective tube 20.

When the metallic protective tube 20 is long, it is necessary to connect the lead wires 4 together, to connect some lead wire protective tubes 8 together in order to ensure line-to-line insulation, or to fill an inorganic power in the lead wire protective tube 8. This is troublesome work and becomes a factor responsible for impeding mass production.

Figure 5A:
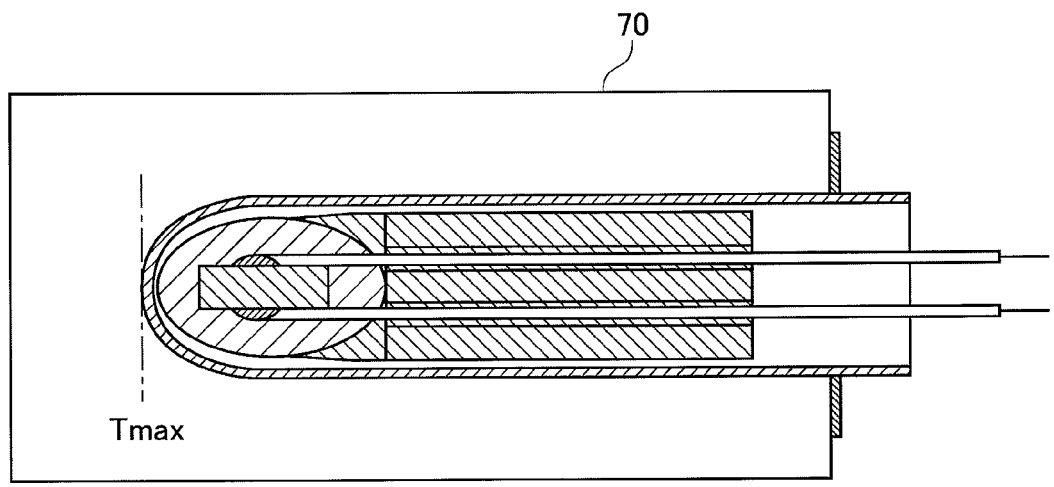
FIGS. 5A and 5B are diagrams showing the condition of a high-temperature energization test, FIG. 5A showing the case where the temperature sensor of the first embodiment is used, and FIG. 5B showing the case where a temperature sensor of a comparative example is used.
Figure 5B:
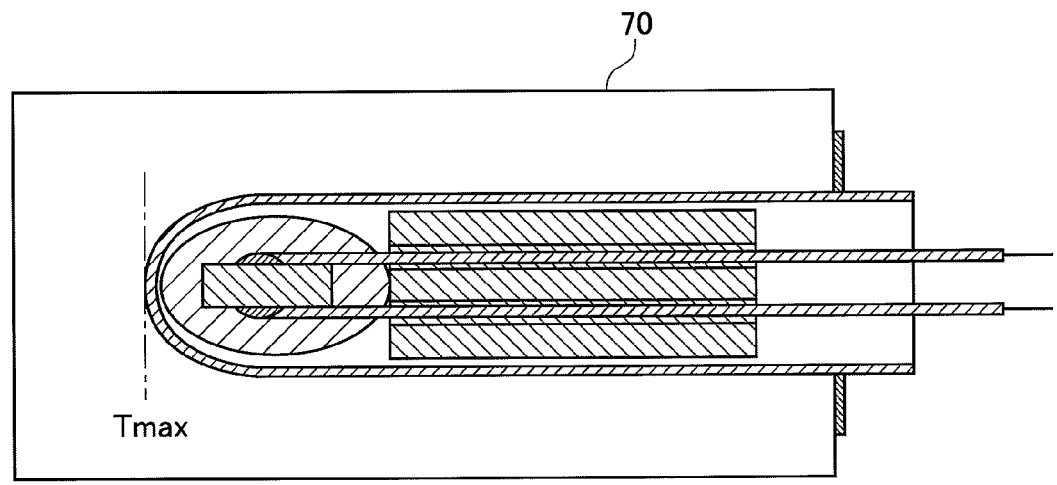

In order to verify the effects of the embodiments, as shown in FIGS. 5A and 5B, with the sensor held in the enclosure 70 and the forward end temperature Tmax set at 500 to 800° C., high-temperature energization tests were conducted. In the test shown in FIG. 5A the temperature sensor 1 of the first embodiment was used, and in the test shown in FIG. 5B a comparative temperature sensor similar to the temperature sensor 1 of the first embodiment was used, with the exception that no sealed end closing body 7 was provided. The results are shown in FIGS. 6A to 6C.

Figure 6A:
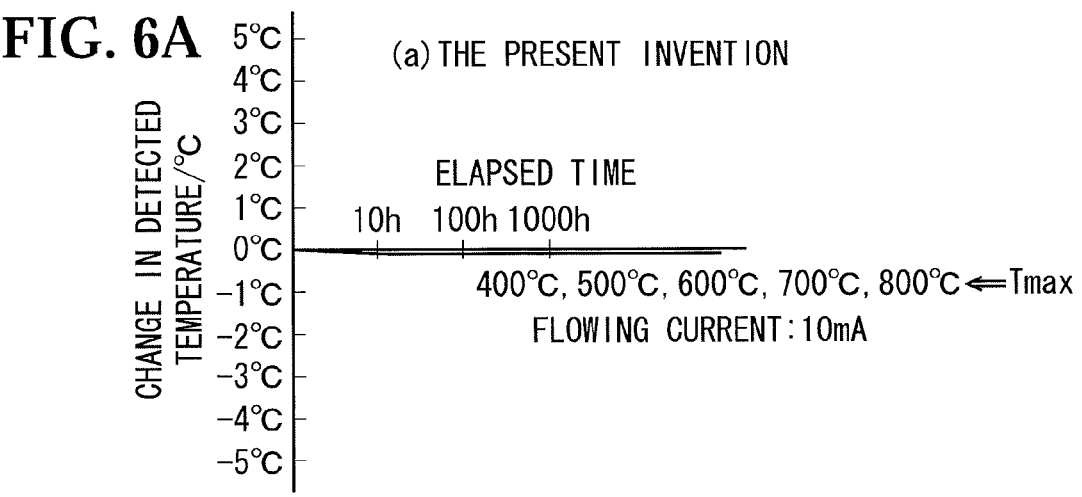
FIGS. 6A to 6C are diagrams showing the results of the high-temperature energization test, FIG. 6A showing the results obtained when the temperature sensor of the first embodiment was used (flowing current: 10 mA), and FIGS. 6B and 6C showing the results obtained when a temperature sensor of a comparative example was used (flowing current: 0.1 mA and 10 mA).
Figure 6B:
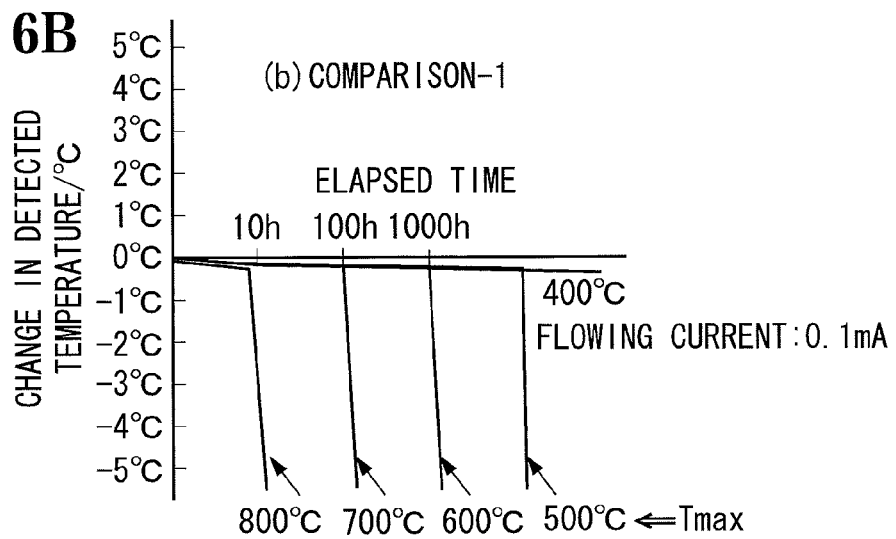
Figure 6C:
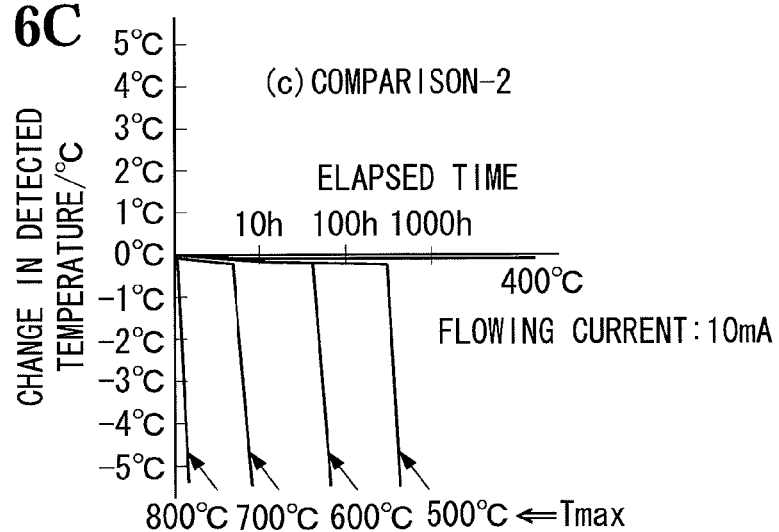

As shown in FIGS. 6A to 6C, when the temperature sensor 1 of the first embodiment was used, changes in the detected temperature were very small even after a lapse of 1000 hours at a flowing current of 10 mA. In contrast to this, in the case of the comparative temperature sensor, there occurred the abnormality that the detected temperature changed greatly in about 10 hours (Tmax: 800° C.) even at a flowing current of 0.1 mA (comparison 1). When the flowing current was increased to 10 mA (comparison 2), detection temperature abnormality occurred in a shorter time. Thus the larger the flowing current, the shorter the endurance time of the temperature sensor.

As described above, because of improved high-temperature endurance, by causing a high current to flow in short pulses, the temperature sensor of the present invention can take out large detection voltage in the range in which self-heating of the temperature sensor does not occur. Therefore, by using the temperature sensor of the present invention, it is possible to input a detection current to an AD converter CV shown in FIG. 7B without using an energization circuit C1 which is such that a resistor R is connected in series to the temperature sensing element 2 shown in FIG. 7A and the voltage after voltage dividing is inputted to an amplifier A as a detection voltage.

Figure 7A:
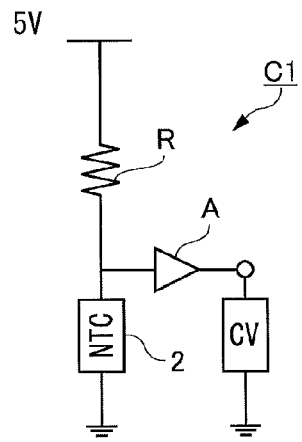
FIGS. 7A, 7B and 7C are diagrams showing the configuration of an energization circuit to a temperature sensor, FIG. 7A showing a circuit which performs low-current DC energization, FIG. 7B showing a circuit which performs a high-current pulse energization, and FIG. 7C showing a current application pattern by the energization circuit of FIG. 7B.
Figure 7B:
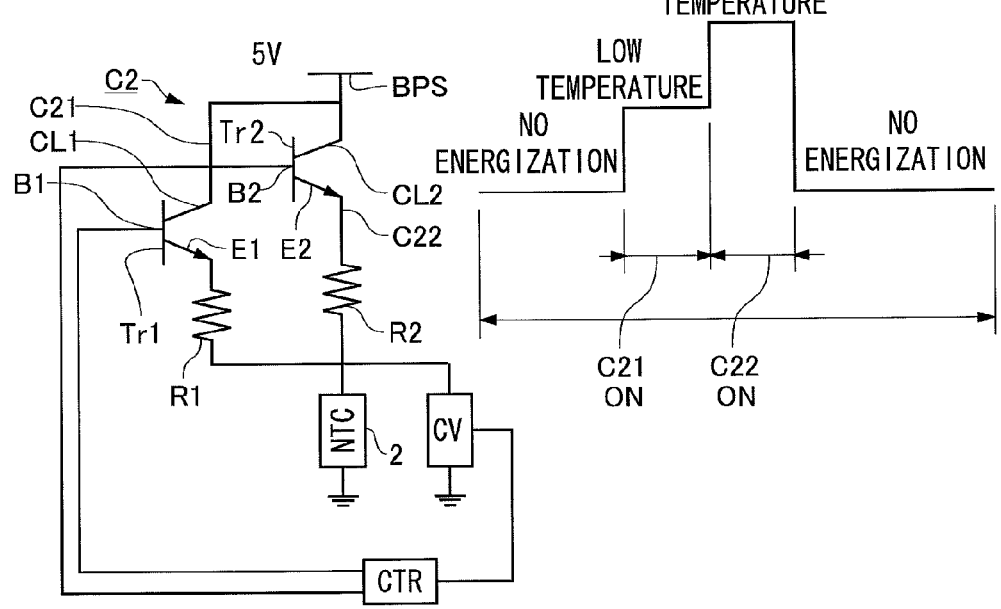

That is, the temperature sensing system shown in FIG. 7B comprises a temperature sensing element (a temperature sensor) 2, an energization circuit C2 which supplies a temperature detection current to the temperature sensing element 2, an AD converter CV to which the temperature information detected by the temperature sensing element 2 is inputted as an analog voltage signal, and a controller CTR which performs control actions by converting a digital signal converted by the AD converter CV into temperature.

The energization circuit C2 comprises two energization circuits: a first energization circuit C21 and a second energization circuit C22 which are connected parallel between a reference power supply BPS and the temperature sensing element 2. The first energization circuit C21 comprises a transistor Tr1, in which a collector CL1 is connected to the reference power supply BPS, and a resistor R1 which is connected in series via an emitter E1 to the transistor Tr1. And the second energization circuit C22 comprises a transistor Tr2, in which a collector CL2 is connected to the reference power supply BPS, and a resistor R2 which is connected in series via an emitter E2 to the transistor Tr2. The resistor R1 and the resistor R2 have different resistance values.

The transistor Tr1 and the transistor Tr2 are connected to the controller CTR via a base B1 and a base 2, respectively. The controller CTR supplies a base current to the base B1 or the base B2, thereby controlling the on-off actions of the transistor Tr1 and the transistor Tr2.

In the case where the transistor Tr1 is on and the transistor Tr2 is off, a temperature detection current is supplied to the temperature sensing element 2 via the first energization circuit C21, then the voltage after voltage dividing of the resistor R1 and the temperature sensing element 2 is inputted to the AD converter CV as temperature information (an analog voltage signal). A digital signal converted in the AD converter CV is inputted to the controller CRT, and the controller CTR converts this digital signal into a detected temperature. On the basis of the detected temperature thus obtained, the controller CTR can control the actions of the apparatus and device which are provided with a temperature sensor system.

In the case where the transistor Tr1 is off and the transistor Tr2 is on, a temperature detection current is supplied to the temperature sensing element 2 via the second energization circuit C22, then the voltage after voltage dividing of the resistor R2 and the temperature sensing element 2 is inputted to the AD converter CV as temperature information (an analog voltage signal). Thereafter, a detected temperature is obtained in the same manner as described above and the controller CTR performs various kinds of control actions on the basis of the detected temperature thus obtained.

Figure 7C:
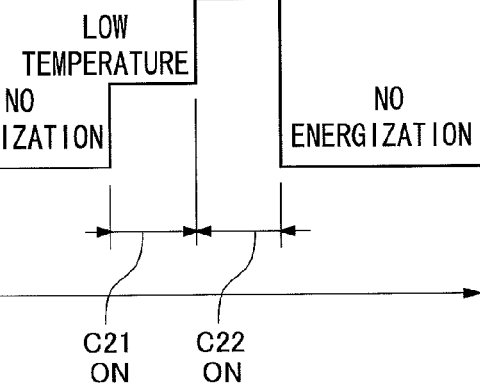

As described above, either the first energization circuit C21 or the second energization circuit C22 selectively supplies a temperature detection current to the temperature sensing element 2 on the basis of instructions from the controller CTR, and this selection is determined by a temperature which is detected. For example, as shown in FIG. 7C, when the detected temperature is low, the first energization circuit C21 is turned on and the second energization circuit C22 is turned off, whereas when the detected temperature is high, the first energization circuit C21 is turned off and the second energization circuit C22 is turned on.

Figure 8:
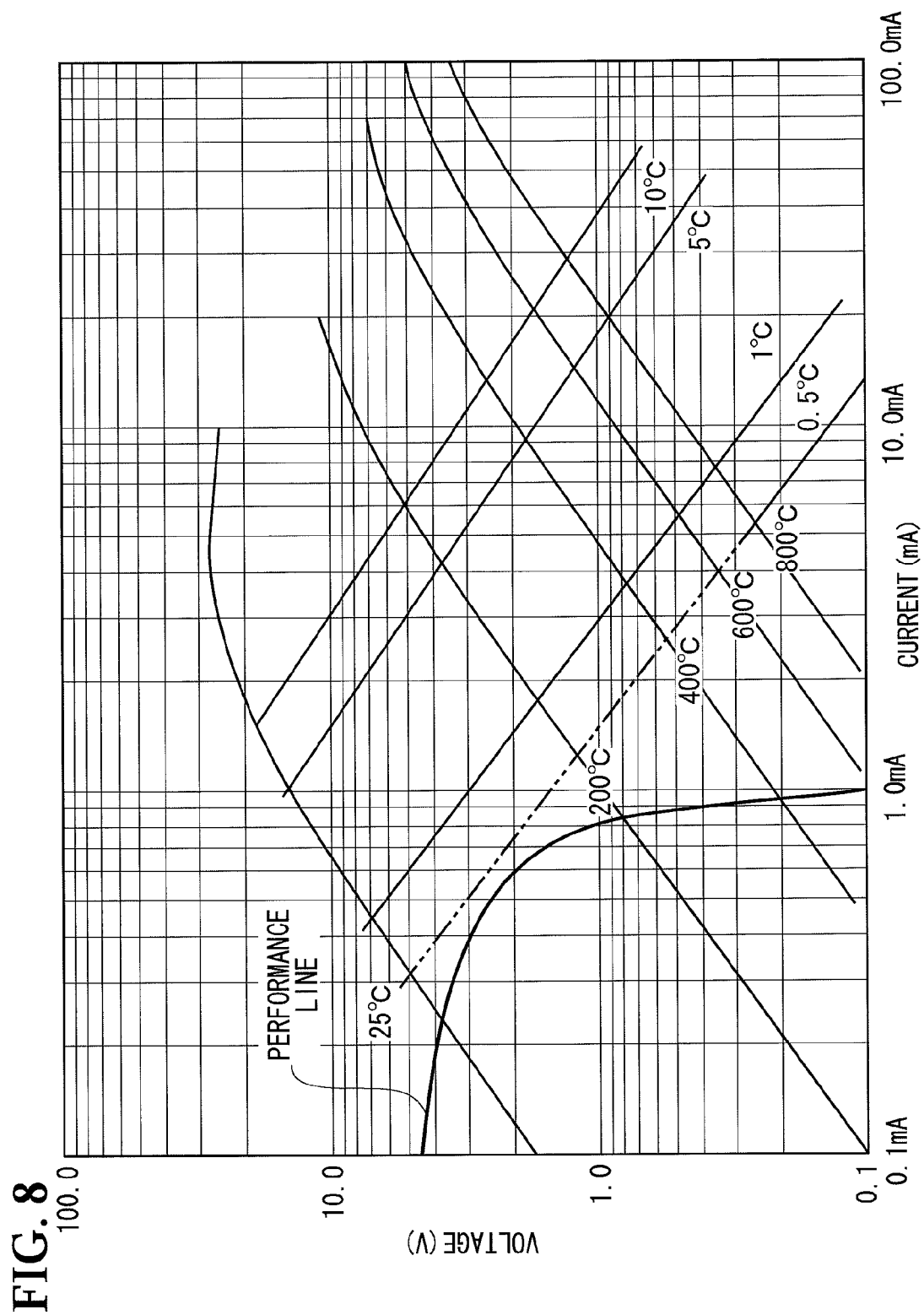
FIG. 8 is a graph showing the I-V characteristic and performance line obtained when energization was performed by the circuit of FIG. 7A.

FIG. 8 shows the I-V (current-voltage) characteristic of a thermistor of the present invention in still air at 25° C., 200° C., 400° C., 600° C. and 800° C. This I-V characteristic indicates the terminal voltage obtained when a constant current is caused to flow through a thermistor, which is plotted on a double logarithmic chart, with the voltage value as ordinate and the current value as abscissa.

As shown in FIG. 8, while self-heating of the temperature sensor does not occur due to joule heat, the voltage value increases at an angle of 45° diagonally rightward according to the current value when a constant current is caused to flow through a thermistor. When before long the thermistor gradually starts self-heating due to joule heat, the increase in the voltage value slows down and eventually the voltage value begins to decrease when passing a voltage maximum point. In general, thermistors exhibit such an I-V characteristic.

Furthermore, the graph of FIG. 8 is a plot of a diagonally leftward increase which shows a power consumption change when the temperature of the thermistor of the present embodiments increases by 0.5° C., 1° C., 5° C. and 10° C. from the ambient temperature according to the power consumption. For example, a 0.5° C. increase states that the temperature of the thermistor becomes 25.5° C. although the ambient temperature is 25° C., and it follows that a temperature 0.5° C. higher than the ambient temperature is detected.

The generally called heat dissipation constant (W/° C.) of a thermistor refers to the constant obtained when the thermistor performs self-heating of 1° C. due to joule heat. Because this is a constant, essentially, the self-heating temperature indicates a diagonally leftward increase of 45°. However, when measurements are made in a wide temperature range, the heat transfer modes of heat (conduction, convection, radiation) change delicately in actual measurements although the measurements are made in still air and, therefore, results as shown in FIG. 8 are often obtained.

Furthermore, FIG. 8 shows the performance line of a thermistor that exhibits such an I-V characteristic when used singly, which is obtained when the thermistor is connected to the energization circuit C1 shown in FIG. 7A and the voltage value inputted to the amplifier A and the current value flowing through the thermistor are plotted on an I-V characteristic diagram.

The resistance value of the series resistor R which limits the current supplied to the thermistor (temperature sensing element) 2 is appropriately selected so that the heat quantity of self-heating shown by the I-V characteristic of thermistor 2 becomes not more than an allowable error.

In the case of this embodiment, the self-heating temperature becomes a maximum at the ambient temperatures of 25° C. to 200° C. However, FIG. 8 shows that this value is not more than 0.5° C.

At the same time, the points of intersection of the I-V characteristic and the performance line indicate the voltage value inputted to the amplifier A when temperature measurements are made at the energization circuit C1 shown in FIG. 7A. For example, the voltage value is 3.8 V if the ambient temperature is 25° C., and the voltage value is 0.8 V if the ambient temperature is 200° C.

Figure 9:
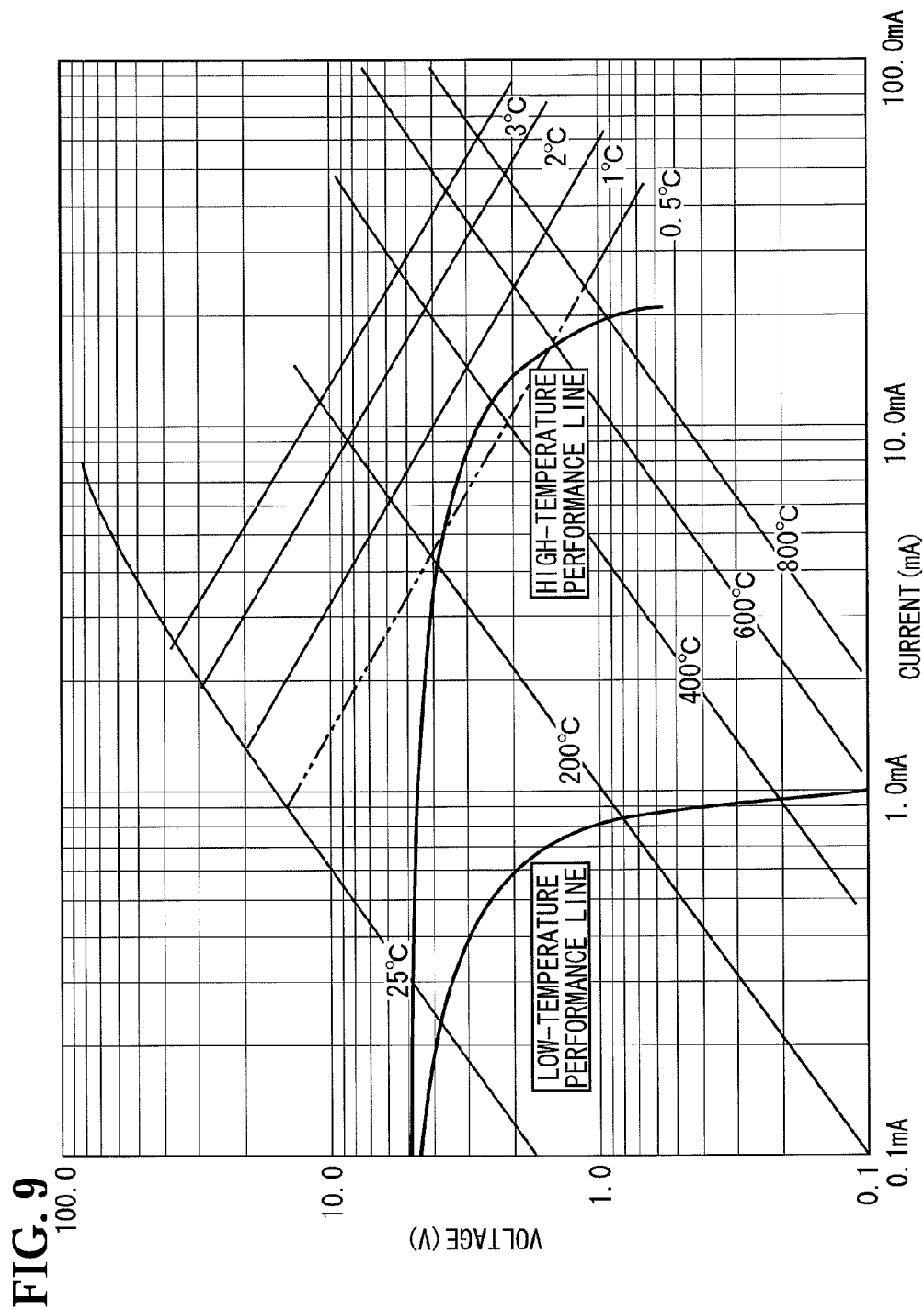
FIG. 9 is a graph showing the I-V characteristic and performance line obtained when energization was performed by the circuit of FIG. 7B.

FIG. 9 shows the pulse I-V characteristic of the same thermistor as shown in FIG. 8 at 25° C., 200° C., 400° C., 600° C. and 800° C. in still air. This pulse I-V characteristic indicates the terminal voltage of the thermistor which occurs in a pulsed manner when a pulse constant current is supplied to the thermistor according to an energization cycle, which is composed of a period in which the energization of the thermistor is performed (on) and a period in which the energization of the thermistor is not performed (off), which is plotted on a double logarithmic chart, with the pulse voltage value as ordinate and the pulse current value as abscissa.

Because the thermistor performs self-heating slightly during the on period as well, the thermistor performs self-heating greatly when the energization time is long. Therefore, the thermistor is cooled by providing the period in which energization is turned off by performing pulse energization.

The voltage value increases at 45° diagonally rightward according to the current value in supplying a pulse constant value to the thermistor while the thermistor does not perform self-heating due to joule heat, the increase in the pulse voltage value slows down when before long the thermistor gradually starts self-heating due to joule heat, and the pulse voltage value begins to decrease when passing a voltage maximum point. These phenomena occur similarly also in the case of pulse energization.

Furthermore, as with FIG. 8, also the graph of FIG. 9 is a plot of a diagonally leftward increase which shows a power consumption change when the temperature of the thermistor increases by 0.5° C., 1° C., 2° C. and 3° C. from the ambient temperature according to the power consumption by pulse energization.

A comparison between FIG. 8 and FIG. 9 reveals that the temperature increase is small even with the same power consumption when pulse energization is performed. For this reason, a voltage maximum point is by far larger in the pulse I-V characteristic than in the I-V characteristic by continuous energization.

Furthermore, FIG. 9 shows the performance lines of a thermistor 2 that exhibits such an I-V characteristic when used singly, which are obtained when the thermistor 2 is connected to the energization circuit C2 shown in FIG. 7B and the voltage value inputted to the AD converter CV and the current value flowing through the thermistor 2 are plotted on an I-V characteristic diagram.

Here the circuit of FIG. 7B will be described.

In the energization circuit C2, the transistors Tr1 and Tr2 in two energization circuits composed of the first energization circuit C21 and the second energization circuit C22 can be switched by a signal from the controller CTR.

The second energization circuit C22 is intended for measuring the high-temperature side, and the resistance value of the current limiting resistor R2 is appropriately selected so that the heat quantity of self-heating shown by the pulse I-V characteristic of thermistor 2 becomes not more than an allowable error. In the case of this embodiment, the self-heating temperature becomes a maximum at an ambient temperature of 400° C. However, that this value is not more than 1° C. is shown in FIG. 9.

The first energization circuit C21 is intended for measuring the low-temperature side, and the resistance value of the current limiting resistor R1 is the same as the limiting resistor R of the energization circuit C1 shown in FIG. 7A.

Next, FIG. 7C shows the timing of energization of the thermistor 2 which is performed by switching the transistors Tr1 and Tr2 in the energization circuit shown in FIG. 7B.

The time during which the transistor Tr1 on the low-temperature side is off and the transistor Tr2 on the high-temperature side is on, is the same as the energization cycle of a pulse constant current used when the pulse I-V measurement was made by the thermistor 2 singly.

The time during which the transistor Tr2 on the high-temperature side is off and the transistor Tr1 on the low-temperature side is on, is substantially the same as when the energization circuit shown in FIG. 7A is used. The self-heating is sufficiently small even when continuous energization is performed. Therefore, if the measurement on the low-temperature side is completed within the pulse energization cycle on the high-temperature side, energization in a pulsed manner may be performed and continuous energization may be performed. FIG. 7C shows an example in which pulse energization was performed.

Because there are two energization circuits C2, which are the first energization circuit C21 and the second energization circuit C22, two performance lines are shown in FIG. 9 and the intersection points of each performance line and the pulse I-V characteristic exist.

When energization is performed with the cycle shown in FIG. 7C, two voltage signals on the high-temperature side and the low-temperature side are inputted to the AD converter CV each once during one cycle, and they are transmitted as digital signals to the controller CTR.

If the voltage on the low-temperature side is less than 0.1 V, the controller CTR judges that the present temperature is not less than 600° C., and computes the voltage value on the high-temperature side which is inputted next to find the present temperature.

Contrastingly, if the voltage on the low-temperature side is not less than 0.1 V, the controller CTR judges that the present temperature is less than 600° C., and computes the voltage value on the low-temperature side to find the present temperature.

Incidentally, in this embodiment, two sets of energization circuits, which are the first energization circuit C21 and the second energization circuit C22, are provided in order to adapt to the low-temperature region and the high-temperature region. However, for example, when the measured temperature region is divided into three: a low-temperature region, a medium-temperature region, and a high-temperature region, three sets of energization circuits are provided. That is, it is sufficient that at least two sets of energization circuits be provided in the present invention, and providing three or more energization circuits is allowed.

In measuring temperature up to a high-temperature region by continuous energization, in the case of the energization circuit C1 of FIG. 7A, it is essential to restrain the heat quantity of self-heating by reducing the applied voltage 5V to 0.5 V, for example, and to combine a high-accuracy amplifier A.

In contrast to this, a high-accuracy amplifier is unnecessary if pulse energization is performed only for the measurement in a high-temperature region and measurements are made by suppressing self-heating.

Figure 10A:
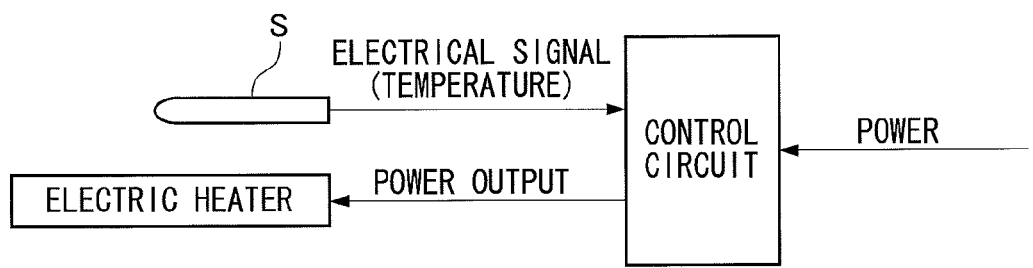
FIG. 10A is a block diagram of an electric heater and FIG. 10B shows a block diagram of a burnup sensor.
Figure 10B:
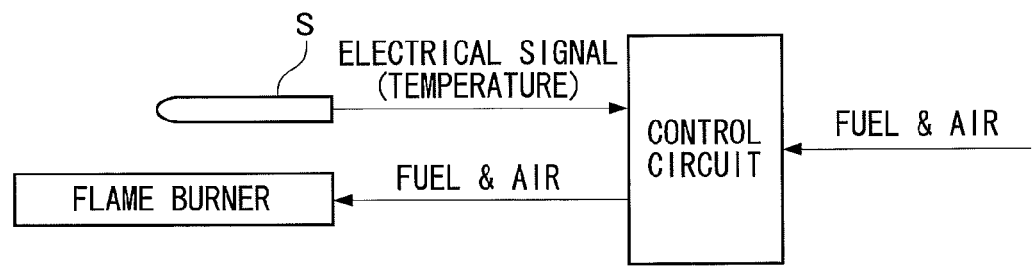
Figure 11:
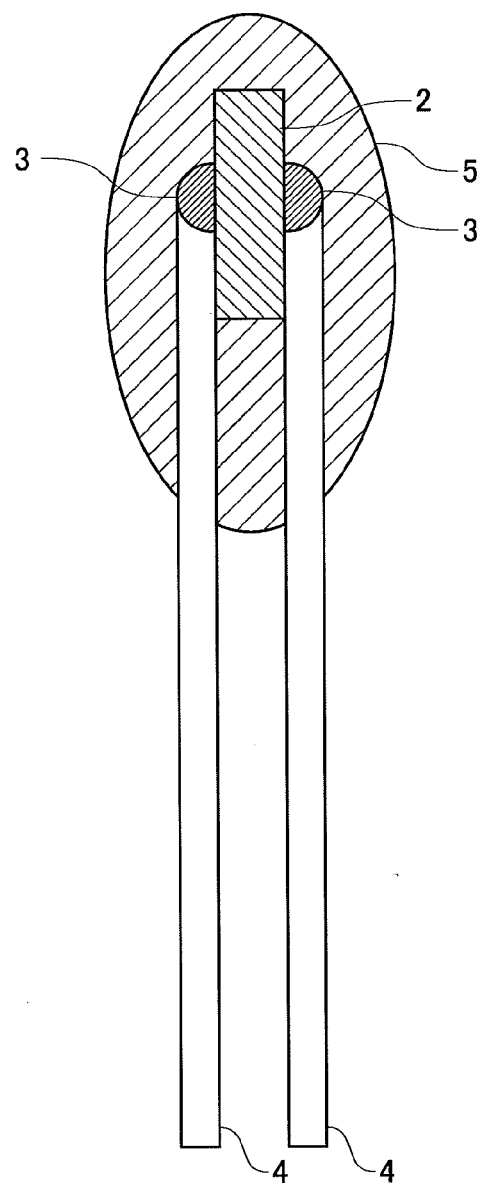
FIG. 11 is a diagram showing a conventional sensor element.
Figure 12A:
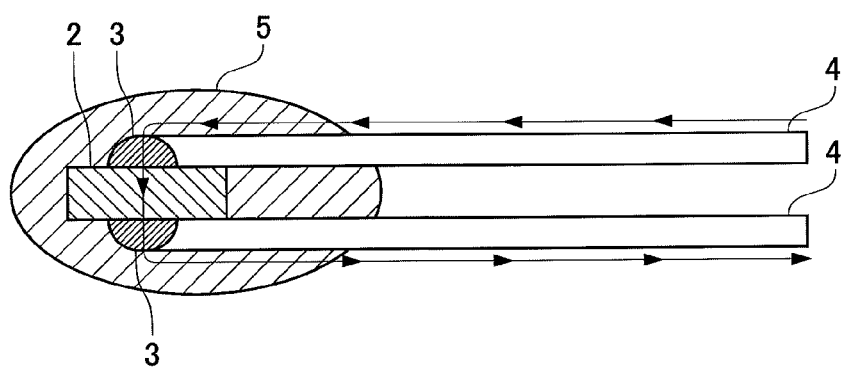
FIG. 12A is a diagram showing the condition of detection current application in the conventional sensor element.
Figure 12B:
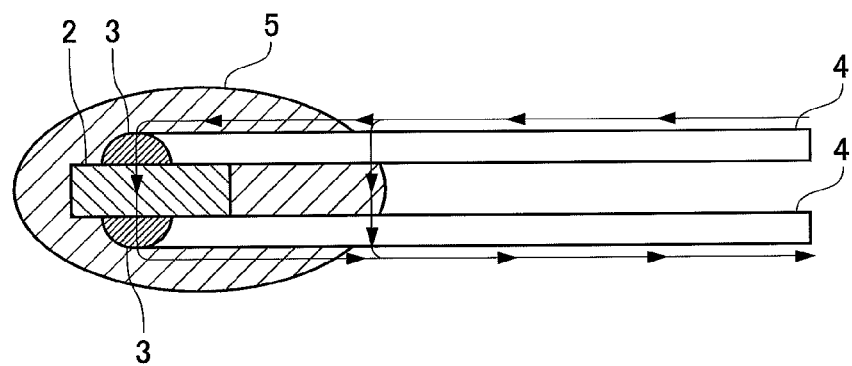
FIG. 12B is a diagram showing the condition of occurrence of a leak current.

The temperature sensor of the present invention can be used in various applications. As such examples, the temperature sensor can be used in the temperature control of an electric heater as shown in FIG. 10A and it can be used in the temperature control of a flame burner as shown in FIG. 10B. In both cases, a detected temperature from a temperature sensor S is compared with a set temperature in a control circuit including an energization circuit, and on the basis of the result of the comparison, input power is controlled in the case of the electric heater and the fuel and air which are charged are controlled in the case of the flame burner. Specific examples of an electric heater include an oven, a radiant heater, and the filter regeneration heater of an exhaust gas cleaner (DPF: diesel particulate filter). Specific examples of a flame burner include a gas burner and a petroleum burner. However, these are illustrative only, and do not limit the present invention.

Although there are cases where a thermocouple is used in the control of temperature, because of small output voltage of a thermocouple, an amplifier which amplifies power by a factor of several hundred to several thousand is indispensable, and in order to restrain an individual difference, a feedback resistor which constitutes a circuit is required to have high accuracy. In order to make the accuracy of detected temperatures high, temperature compensation is necessary. Furthermore, because the manufacture of a thermocouple is troublesome and because in the case of a thermocouple, it is virtually impossible to control the contact point of the forward end of a sensor, the accuracy of a temperature measuring position is exceedingly low compared to a temperature sensor in which a thermistor is used.

For this reason, when a thermocouple is used in a temperature sensor, an individual difference is generated in detected temperatures, with the result that this may impair the accuracy as a temperature detecting commercial product due to an individual difference of control equipment. In contrast to this, these problems do not occur in the temperature sensor of the present invention.

Although it is possible to perform temperature detection and temperature control using a sensor element in which the temperature sensing element 2 is not covered with the covering material 5, i.e., glass, the high-temperature endurance is exceedingly inferior, use under high temperatures is impossible, and an expensive amplifier is necessary because a strong signal cannot be obtained. Using the temperature sensor of the present invention in consideration of supply and cost, provides superiority in terms of small individual difference, excellent endurance and low cost.

The embodiments of the present invention were described above in detail on the basis of the drawings. However, in addition, it is possible to make a choice from the configurations given in the above-described embodiments and to appropriately change the configurations to other configurations so long as these configurations do not depart from the gist of the present invention.

REFERENCE SIGNS LIST 1, 30, 40, 50, 60 . . . Temperature sensor
10, 25, 35, 45 . . . Sensor element unit
2 . . . Temperature sensing element 3 . . . Electrode 4 . . . Lead wire 5 . . . Covering material 6 . . . Sealed end 7 . . . Sealed end closing element 26, 36, 38 . . . Shield 8 . . . Lead wire protective tube 9 . . . Filler 20 . . . Metallic protective tube C1, C2 . . . Energization circuit C21 . . . First energization circuit C22 . . . Second energization circuit CV . . . AD converter CTR . . . Controller

The invention claimed is:

1. A temperature sensor comprising:
a sensor element comprising a temperature sensing element whose electrical resistance changes according to temperature; a pair of lead wires electrically connected to the temperature sensing element: and a covering material which seals the temperature sensing element and the lead wires in a prescribed range from the connections; wherein the lead wires are led out of the sealed ends of the covering material;
a metallic protective tube which houses the sensor element except part of the lead wires; and
a shield made of ceramic comprising a sealed end closing section which is present between the temperature sensing element and the metallic protective tube and encloses the sealed ends, and a lead wire protective section having through holes in which the lead wires taken out of the sealed ends are housed in a piercing manner,
wherein the shield is loosely fitted inside the metallic protective tube.

2. The temperature sensor according to claim 1, wherein a sensor element unit in which the sensor element and the shield are integrally formed beforehand is inserted into the metallic protective tube which is separately formed beforehand and fixed thereto.

3. The temperature sensor according to claim 1 or 2, wherein the lead wire protective section comprises a protective section body having the through holes through which the lead wires pierce and a filling material made of ceramic which is interposed between the protective section body and the lead wires which pierce through the through holes.

4. The temperature sensor according to claim 3, wherein the sealed end closing section is formed integrally with the filling material.

5. The temperature sensor according to claim 1, wherein if a side where the temperature sensing element is arranged is regarded as a front and a side where the lead wires are provided in an extended manner is regarded as a rear, the sealed end closing section closes the sealed end by surrounding at least the rear end side of the covering material.

6. The temperature sensor according to claim 1 or 5, wherein if a side where the temperature sensing element is arranged is regarded as a front and a side where the lead wires are provided in an extended manner is regarded as a rear, the metallic protective tube is such that the front end thereof is closed and the rear end thereof is open, and
wherein the front end of the covering material is directly or indirectly abutted against an internal circumferential surface of the metallic protective tube at the front end.

7. The temperature sensor according to claim 1 or 2, wherein the shield is made of ceramic in which the sealed end closing section and the lead wire protective section are integrally formed.

8. A temperature sensor system comprising:
the temperature sensor according to any one of claims 1 to 7;
an energization circuit which supplies a temperature detection current to the temperature sensor;
an AD converter to which the temperature information detected by the temperature sensor is inputted as an analog voltage signal; and
a controller which performs control actions by converting a digital signal converted by the AD converter into a temperature,
wherein the energization circuit supplies the temperature sensor with a pulsed temperature detection current on the basis of instructions of the controller.

* * * * *